Patented Mar. 23, 1943

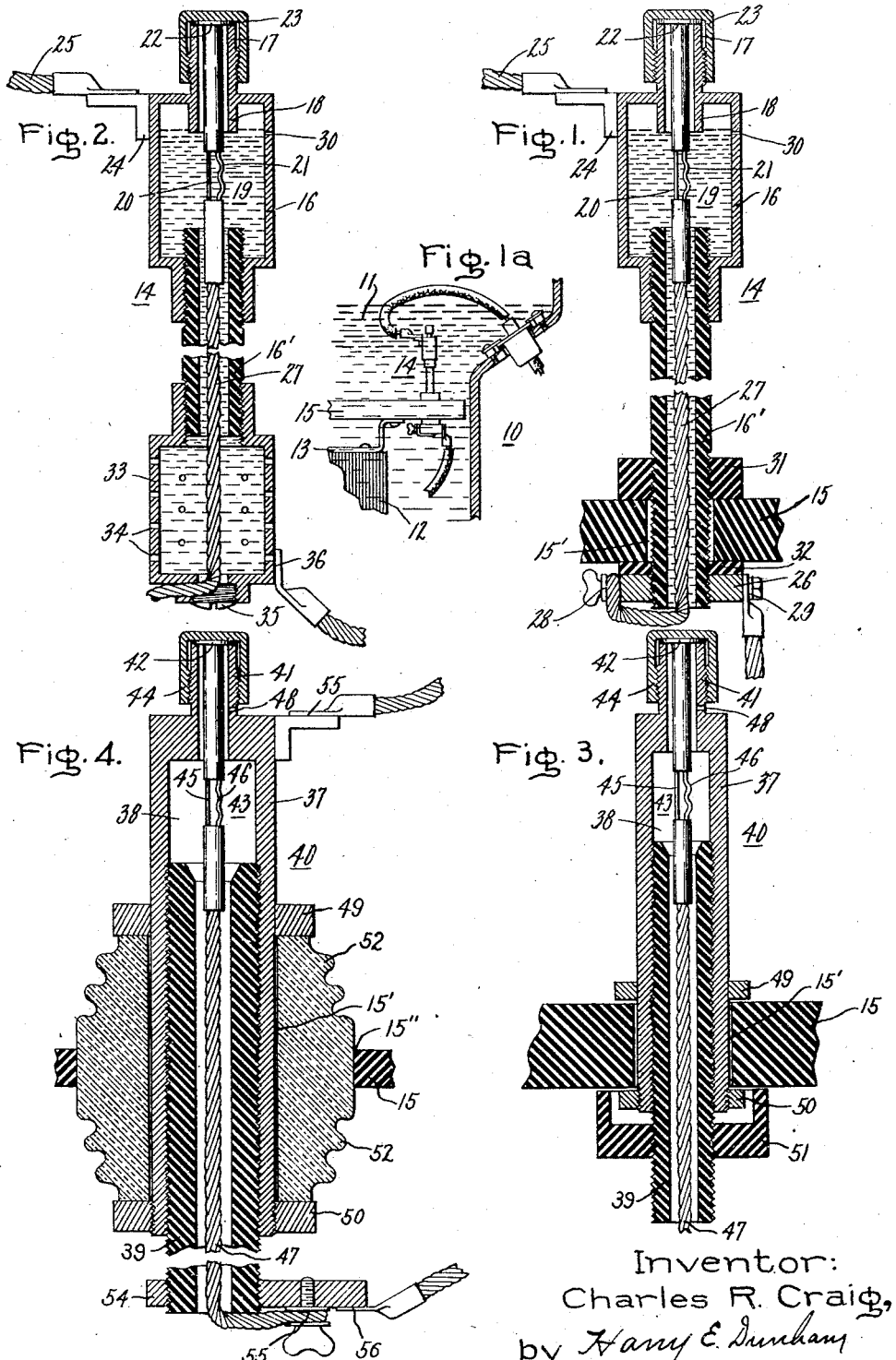

2,314,346

UNITED STATES PATENT OFFICE 2,314,346

PROTECTIVE DEVICE

Charles R. Craig, Pittsfield, Mass., assignor to General Electric Company, a corporation of New York Application October 14, 1941, Serial No. 414,917

7 Claims. (Cl. 200—120)

My invention relates to protective devices and more particularly to fused protective devices for protecting electrical apparatus of the liquid insulation filled type, such as transformers and the like, where the fused protective device is mounted within the casing of the electrical apparatus. Specifically, my invention relates to protective devices of the type disclosed and claimed in United States Letters Patent 2,223,232, granted November 26, 1940, upon an application of S. R. Smith, and assigned to the same assignee as the present application.

It is an object of my invention to provide a new and improved fused protective device for electrical apparatus which is simple and sturdy in construction and relatively inexpensive.

It is another object of my invention to provide an improved fuse device and mounting therefor.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a sectional view of one embodiment of my invention, Fig. 1a illustrates a portion of an electric translating apparatus and the mounting arrangement of the fuse device of Fig. 1 with respect thereto, and Figs. 2, 3, and 4 are sectional views of modifications of the fused protective device of Fig. 1.

Although my invention may be employed in the protection of forms of electrical apparatus other than transformers, such as, for example, capacitors, where similar problems may be encountered, I have elected for the purpose of describing and illustrating my invention to show it as applied to the protection of an electric translating apparatus, such as a transformer. In Fig. 1a of the drawing, 10 designates an electric translating apparatus, such as a transformer, only a portion of which is shown to illustrate the internal assembly of the translating device with particular relationship to the fused protective device to be described hereinafter. It should be understood that the particular construction of the transformer has no bearing on the present invention and is merely schematically shown for the purpose of illustrating my invention. The interior of the transformer casing is preferably filled or substantially filled with a liquid insulation 11, such as oil, or a liquid halogenated hydrocarbon composition, such as is described and claimed in United States Letters Patent 1,931,373, granted upon an application of F. M. Clark, and assigned to the same assignee as the present application. Immersed in the insulating liquid are the transformer windings, not shown, the transformer core 12, and a core-clamping framework 13. Fuse devices of the present invention are particularly adapted to be supported within the transformer casing submerged or at least partially submerged in the body of liquid dielectric 11 and connected in series with one set of transformer leads. Although Fig. 1a shows only one of the fuse devices, generally indicated at 14, connected in one of the leads of the transformer, a plurality of devices may, if desired, be so connected where taps or series-parallel connections are employed.

In transformer constructions made heretofore, the core-clamping structure or framework 13 often supports an insulating member or support of some sort such as 15 in Fig. 1a, which is particularly adapted to support the fuse device 14 of the present invention.

Referring now to Fig. 1, the fuse device 14 comprises a tubular casing formed of a metallic arc chamber 16 of relatively large volume, which is constructed of a material adapted to withstand high pressures, and an insulating cylindrical member 16'. The insulating cylindrical member 16' is threadedly mounted in one end of arc chamber 16 so as to complete the tubular casing for the fuse device 14. The other end of arc chamber 16 is provided with a tubular extension 17 of reduced diameter which, as is shown in the drawing, is preferably integrally formed with arc chamber 16. Tubular extension 17 also has a depending portion 18 which extends for a short distance into arc chamber 16 in Fig. 1. Insulating cylindrical member 16' is preferably formed of an insulating material from which gas is evolved when subjected to the heat of an electric arc or, if desired, insulating cylindrical member 16' may be formed of a suitable insulating material lined with a gas-evolving material. Mounted within the tubular casing of fuse device 14 is a fuse link, generally indicated at 19, which is preferably of the well-known buttonhead type. Fuse link 19 comprises a short fusible section mounted within arc chamber 16 and includes a strain wire 20 and a fusible link 21. The buttonhead 22 of fuse link 19 is clamped into position against the end of tubular extension 17 of arc chamber 16 by means of an end closure member 23 threadedly mounted on tubular extension 17. The upper terminal of fuse link 19 comprises member 24 electrically connected with arc chamber 16 which may be connected with a siutable conductor 25 as shown in Fig. 1.

The lower terminal of the fuse device 14 comprises a terminal nut 26 threadedly mounted on insulating cylindrical member 16'. The lower end of fuse link 19 which comprises a flexible conductor 27 is electrically connected to terminal nut 26 as at 28. External electrical connections with terminal nut 26 may readily be made as at 29. Preferably, these external connections are mode diametrically opposite the connection with the fuse link 28 so that they may be completed without disturbing fuse link 19.

The fuse device 14 is preferably submerged in the body of dielectric 11 so that the major portion of arc chamber 16 is below the liquid dielectric level or it may be completely submerged as indicated in Fig. 1a. In this manner, the arc chamber 16, within which the fusible section of fuse link 19 is placed, provides a very large volume of liquid dielectric to cool the arc which forms upon rupture of the fusible element.

In order to allow the liquid dielectric to rise into fuse device 14 almost to fill it and surround the fuse link 19 including the fusible section 21 and strain wire 20, a suitable vent 30 is provided in the wall of arc chamber 16 opposite the bottom end of depending portion 18 so that contained air may escape as the liquid rises to the level of the air vent after which air will be trapped above the liquid level inside chamber 16 and around the depending portion 18. Air will also be trapped in tubular extension 17 but, should closure member 23 be removed for replacement of fuse link 19 and the air in tubular extension 17 displaced by liquid, the trapped air inside chamber 16 above vent 30 and surrounding depending portion 18 will remain, the purpose of this trapped air being to help cushion the impulse shock resulting from current interruption by the fuse device. Vent 30 is sufficiently small so that substantially no liquid can escape therethrough in the short interval of time during arc interruption and, therefore, the pressure built up in arc chamber 16 is maintained to force liquid, fuse link parts, and the arc out through insulating cylindrical member 16', thereby facilitating cooling of the arc and interruption of the current in the circuit.

In order to support the fuse device 14 in the position indicated in Fig. 1a, I provide a pair of insulating nuts 31 and 32 which are threadedly mounted on insulating cylindrical member 16'. Insulating nut 31 is mounted above support 15 while insulating nut 32 is mounted below support 15 to support fuse device 14 rigidly in the position indicated in Fig. 1a, the insulating cylindrical member 16' extending through an opening 15' in insulating support 15.

From the above description, it will be obvious that I have provided a fuse device with simple supporting means permitting ready removal and replacement of the device when desired.

Since the fuse device 14 is usually used inside the tank or casing of liquid filled electrical apparatus, such as transformers, it may be desirable to provide means for catching the molten or solid metallic parts of the fuse link blown out of the tubular casing upon operation of the fuse device. In Fig. 2, the fuse device 14 of Fig. 1 is shown with the corresponding parts thereof designated by the same reference numerals as in Fig. 1. In order to simplify the drawing, the supporting means for the fuse device 14 has not been shown in Fig. 2. Threadedly mounted at the lower end of insulating cylindrical member 16' is a housing member 33 which takes the place of metallic terminal nut 26 of Fig. 1. Housing member 33 forms an enlarged chamber with suitable openings 34 therein so that liquid dielectric may be expelled therethrough upon operation of the fuse device but which openings are sufficiently small to prevent the escape of the metallic parts which are caught in housing member 33. The flexible conductor 27 of fuse link 19 is electrically connected with metallic housing member 33 as by set screw 35 threadedly mounted in the lower end of housing member 33. External electrical connections may be made with the lower end of fuse device 14 by connection with metallic housing member 33 as shown at 36.

Although in Figs. 1 and 2, I have indicated a fuse device in which the arc chamber 16 adapted to withstand high pressures comprises only the portion of tubular casing 16 within which the fusible section of fuse link 19 is mounted, it may be desirable that all of the tubular casing be made sufficiently strong to withstand the high pressures and, accordingly, in Fig. 3, I have illustrated a modification of my invention in which a metallic cylindrical member 37 provides an arcing chamber 38 at the upper end thereof similar to the arcing chamber 16 of Figs. 1 and 2. A tubular insulating member 39 is threadedly or otherwise mounted within metallic cylinder 37 which reenforces the insulating tubular member 39 and the two members 37 and 39 form the tubular casing of the fuse device 40 of Fig. 3. Metallic cylinder 37 is provided with an extension 41 of reduced diameter for cooperating with the buttonhead 42 of a fuse link 43 in the same manner as the construction shown in Fig. 1. A suitable end closure member 44 is threadedly mounted on tubular extension 41 to clamp the buttonhead 42 of fuse link 43 into position. The fusible section including strain wire 45 and fusible link 46 of fuse link 43 is arranged to be within the portion of metallic cylinder 37 of relatively large volume above insulating cylindrical member 39. A suitable flexible conductor 47 forms the lower end of fuse link 43 and is electrically connected to a suitable lower terminal, not shown. A vent 48 is provided in the upper tubular extension 41 of metallic cylinder 37 for the purpose of allowing trapped air within the cylinder to escape so that the insulating liquid may rise into the fuse device surrounding the fuse link 43. The fuse device 40 may be supported on an insulating member 15, having an opening 15' therein through which the tubular casing of the fuse device may extend, by means of an annular member 49 which may be brazed or welded to metallic cylinder 37. The lower end of metallic cylinder 37 is then placed in opening 15' of support 15 and a metallic nut 50 is threadedly mounted at the lower end of cylinder 37 to clamp supporting member 15 between annular member 49 and nut 50. In order to prevent hot gases and the like expelled from the lower end of the tubular casing of fuse device 40 from coming in contact with metallic cylinder 37 and nut 50, I provide an insulating cup-shaped member 51 threadedly mounted on insulating cylindrical member 39 which extends below the reenforcing metallic cylinder 37.

A modification of the supporting means of Fig. 3 is shown in Fig. 4 in which the fuse device is designated by the corresponding reference numerals used in Fig. 3. In this case, an insulating cylinder or bushing 52 having an opening 15' therein extends through hole 15" in support 15 with metallic cylinder 37 clamped as shown by means of annular member 49 and nut 50 to support fuse device 40 in the same manner as in Fig. 3. A terminal nut 54, not shown in Fig.3, is threadedly mounted on the end of insulating cylindrical member 39 extending below metallic cylinder 37 to which the flexible conductor 47 of fuse link 43 is electrically connected as at 55. Electrical connections to the fuse device 40 may be made at 55 and 56 as shown in Fig. 4.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. In a fuse device of the type at least partially submerged in a liquid dielectric, a tubular casing including an arc chamber of relatively large volume constructed of a material adapted to withstand high pressures, a fuse link in said casing including a fusible section located in said arc chamber, closure means for the top end of said casing, and means defining a small air vent near the top end of said casing for permitting air to escape from said casing to allow the liquid dielectric to rise in said casing to surround said fusible section to a level above which a predetermined amount of air will be permanently trapped to cushion the shock resulting upon operation of said fuse device.

2. In a fuse device of the type at least partially submerged in a liquid dielectric, a tubular casing including at one end thereof an arc chamber of relatively large volume constructed of a material adapted to withstand high pressures, a fuse link in said casing including a fusible section located in said arc chamber, closure means for the arc chamber end of said casing, means including a depending portion extending into said arc chamber end of said casing, and means defining a small air vent near the closed end of said casing for permitting air to escape and said liquid dielectric to rise in said arc chamber to surround said fusible section to a level above the extremity of said depending portion so that a predetermined amount of air will be trapped to cushion the shock resulting upon operation of said fuse device.

3. In a protective device for electric apparatus of the type having a body of liquid insulating dielectric, the combination of an insulating support, a tubular casing, means for mounting said tubular casing on said insulating support so as to be at least partially submerged in said body of dielectric, a fuse link in said casing, closure means for the top end of said casing, and means defining a small air vent near the top end of said casing for permitting air to escape from said casing to allow the liquid dielectric to rise in said casing to surround said fuse link, said vent being sufficiently small that substantially no liquid can escape therethrough in the short interval of time during rupture of said fuse link and consequent circuit interruption.

4. In an electric apparatus, the combination of an insulating support, a protective device comprising a fuse link including a fusible section, an arc chamber for the fusible section of said fuse link, a body of liquid dielectric, said arc chamber having an opening at the bottom thereof for receiving said liquid dielectric, said fuse link being so disposed in said arc chamber as to be immersed in said body of dielectric, closure means for the top of said arc chamber, and means defining a small air vent near the top of said chamber for permitting air to escape from said casing to allow the liquid dielectric to rise in said chamber to a level above which a predetermined amount of air is permanently trapped to cushion the shock resulting upon operation of said fuse device.

5. In a fuse device of the type at least partially submerged in a liquid dielectric, a tubular casing including an arc chamber of relatively large volume constructed of a material adapted to withstand high pressures, a fuse link in said casing including a fusible section located in said arc chamber, closure means for the top end of said casing, means defining a small air vent near the top end of said casing for permitting air to escape from said casing to allow the liquid dielectric to rise in said casing to surround said fusible section to a level above which a predetermined amount of air will be permanently trapped to cushion the shock resulting upon operation of said fuse device, and means for completing external electrical connections to said fuse device without disturbing said fuse link.

6. In a protective device for an electric translating apparatus of the type having a body of liquid insulating dielectric, the combination of an insulating support, a tubular casing, means for mounting said tubular casing on said insulating support so as to be at least partially submerged in said body of liquid dielectric, a fuse link in said casing including a fusible section, closure means for the top end of said casing, means defining a small air vent near the top end of said casing for permitting air to escape from said casing to allow the liquid dielectric to rise in said casing to surround said fusible section, external electrical connections for said protective device, and means for replacing said fuse link without disturbing said external electrical connections.

7. In a fuse device of the type at least partially submerged in a liquid dielectric, a tubular casing including an arc chamber of relatively large volume constructed of a material adapted to withstand high pressures, a fuse link in said casing including a fusible section located in said arc chamber, closure means for the top end of said casing, means defining a small air vent near the top end of said casing for permitting air to escape from said casing to allow the liquid dielectric to rise in said casing to surround said fusible section to a level above which a predetermined amount of air will be permanently trapped to cushion the shock resulting upon operation of said fuse device, and means associated with said casing for catching the molten or solid metallic parts of the fuse link blown out of said casing upon operation of said fuse device.

CHARLES R. CRAIG.